（12） United States Patent
Abdel-Rahman et al.

(10) Patent No.: US 11,298,993 B2
(45) Date of Patent: Apr. 12, 2022

(54) DETECTION OF TRAILER DETACHMENT FROM A VEHICLE

(71) Applicant: GM GLOBAL TECHNOLOGY OPERATIONS LLC, Detroit, MI (US)

(72) Inventors: Akram M. Abdel-Rahman, Ajax (CA); Shiv G. Patel, Toronto (CA); Ephraim C. Yuen, Markham (CA); Kibrom Yohannes, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 398 days.

(21) Appl. No.: 16/441,906

(22) Filed: Jun. 14, 2019

(65) Prior Publication Data

US 2020/0391562 A1 Dec. 17, 2020

(51) Int. Cl.
*B60D 1/28* (2006.01)
*B60D 1/06* (2006.01)
*B60D 1/58* (2006.01)
*B60W 10/18* (2012.01)
*B60W 10/20* (2006.01)

(52) U.S. Cl.
CPC ............... *B60D 1/065* (2013.01); *B60D 1/28* (2013.01); *B60D 1/58* (2013.01); *B60W 10/18* (2013.01); *B60W 10/20* (2013.01); *B60R 2300/30* (2013.01); *B60R 2300/808* (2013.01); *B60W 2300/14* (2013.01)

(58) Field of Classification Search
CPC . B60D 1/065; B60D 1/28; B60D 1/58; B60D 1/62; B60W 10/18; B60W 10/20; B60W 2300/14; B60R 2300/808; B60R 2300/30; B62D 15/025; B62D 13/00
See application file for complete search history.

(56) References Cited

U.S. PATENT DOCUMENTS

| | | | | |
|---|---|---|---|---|
| 6,769,709 B1* | 8/2004 | Piper | ......................... | B60D 1/36 280/432 |
| 7,777,615 B2* | 8/2010 | Okuda | ...................... | B60D 1/36 340/431 |
| 9,403,413 B2* | 8/2016 | Talty | ......................... | B60D 1/36 |
| 2015/0115571 A1* | 4/2015 | Zhang | .................... | H04N 7/183 280/477 |
| 2018/0050626 A1* | 2/2018 | Delp | ....................... | G06Q 50/30 |
| 2018/0081370 A1* | 3/2018 | Miller | ...................... | B60D 1/36 |

* cited by examiner

*Primary Examiner* — Kevin Hurley
*Assistant Examiner* — Marlon A Arce
(74) *Attorney, Agent, or Firm* — Cantor Colburn LLP (57) ABSTRACT

A system for monitoring a trailer includes a detection device configured to monitor a connection between a coupler attached to the trailer and a trailer hitch attached to a vehicle and generate data related to the connection, and a processing device configured to receive the data from the detection device, and analyze the data to detect whether a partial detachment condition is present. Based on detecting the partial detachment condition, the processing device is configured to generate a notification to a driver to alert the driver of the partial detachment condition and/or control operation of the vehicle.

20 Claims, 5 Drawing Sheets

DETECTION OF TRAILER DETACHMENT FROM A VEHICLE

The subject disclosure relates to the art of motor vehicles and, more particularly, to a system and method for detecting detachment of a trailer from a vehicle.

Modern vehicles are often utilized to tow trailers of various kinds. Such vehicles can be equipped with trailer hitches, which are commonly ball coupler type hitches. Such hitches include a coupler that receives a ball attached to a trailer, and a safety chain in the event that the trailer hitch detaches from the coupler. A detached coupler can pose a significant safety hazard, and can result in an accident and/or damage if the detachment is not detected quickly and if appropriate measures are not quickly taken. In some cases, a driver may not be aware that a trailer has detached, as in some instances the trailer can be pulled by a safety chain or other safety device.

SUMMARY

In one exemplary embodiment, a system for monitoring a trailer includes a detection device configured to monitor a connection between a coupler attached to the trailer and a trailer hitch attached to a vehicle and generate data related to the connection, and a processing device configured to receive the data from the detection device, and analyze the data to detect whether a partial detachment condition is present. Based on detecting the partial detachment condition, the processing device is configured to perform generating a notification to a driver to alert the driver of the partial detachment condition and/or controlling operation of the vehicle.

In addition to one or more of the features described herein, the detection device includes a camera and the data includes an image of at least a part of the coupler and at least a part of the trailer hitch.

In addition to one or more of the features described herein, the trailer hitch includes a ball, and the processing device is configured to detect the partial detachment condition based on the ball being visible in the image.

In addition to one or more of the features described herein, the processing device is configured to compare a location of the coupler to a reference location, and to detect the partial detachment condition based on the location of the coupler being a distance from the reference location exceeding a selected threshold distance.

In addition to one or more of the features described herein, controlling the operation of the vehicle includes controlling vehicle braking.

In addition to one or more of the features described herein, the processing device is configured to compare a location of the coupler to a reference location, and to adjust a braking force based on a distance between the location of the coupler and the reference location.

In addition to one or more of the features described herein, controlling operation of the vehicle includes controlling vehicle steering.

In addition to one or more of the features described herein, controlling vehicle steering includes limiting an angular range of steering to avoid oversteering by the driver.

In addition to one or more of the features described herein, controlling vehicle steering includes autonomously steering the vehicle to remove the vehicle and the trailer from a road.

In addition to one or more of the features described herein, the partial detachment condition is detected based on the coupler and the trailer hitch being separated and the vehicle being connected to the trailer by a safety device.

In one exemplary embodiment, a method of monitoring a trailer includes monitoring, by a detection device, a connection between a coupler attached to the trailer and a trailer hitch attached to a vehicle, and generating data related to the connection. The method also includes receiving the data from the detection device by a processing device, analyzing the data to detect a partial detachment condition, and based on detecting the partial detachment condition, generating a notification to a driver to alert the driver of the partial detachment condition and/or controlling operation of the vehicle.

In addition to one or more of the features described herein, the detection device includes a camera and the data includes an image of at least a part of the coupler and at least a part of the trailer hitch.

In addition to one or more of the features described herein, the trailer hitch includes a ball, and the partial detachment condition is detected based on the ball being visible in the image.

In addition to one or more of the features described herein, analyzing the data includes comparing a location of the coupler to a reference location, and the partial detachment condition is detected based on the location of the coupler being a distance from the reference location exceeding a selected threshold distance.

In addition to one or more of the features described herein, controlling operation of the vehicle includes controlling vehicle braking.

In addition to one or more of the features described herein, controlling vehicle braking includes comparing a location of the coupler to a reference location, and adjusting a braking force based on a distance between the location of the coupler and the reference location.

In addition to one or more of the features described herein, controlling operation of the vehicle includes controlling vehicle steering.

In addition to one or more of the features described herein, controlling vehicle steering includes limiting an angular range of steering to avoid oversteering by the driver.

In addition to one or more of the features described herein, controlling vehicle steering includes autonomously steering the vehicle to remove the vehicle and the trailer from a road.

In addition to one or more of the features described herein, the partial detachment condition is detected based on the coupler and the trailer hitch being separated and the vehicle being connected to the trailer by a safety device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for detecting detachment of a trailer from a vehicle and/or responding to trailer detachment are described herein. An embodiment of a trailer monitoring system includes a detection device disposed at a vehicle and/or a trailer, and a processing device configured to receive data from the detection device and detect or identify a condition in which the trailer has detached or partially detached from the vehicle. In one embodiment, the processing device is configured to perform one or more of various actions in response to identifying the condition. For example, the processing device can be configured to notify a driver or control system in the vehicle and/or control various vehicle functions (e.g., braking and/or steering).

Embodiments described herein have numerous advantages. Detachment or partial detachment of a trailer from a vehicle presents a significant safety hazard. In many cases, if a trailer partially detaches from a vehicle, a safety chain or other safety device may still connect the trailer to the vehicle, resulting in the trailer being pulled by the safety chain. In such cases, partial detachment may not be readily detectable by a driver. Embodiments of the system or systems described herein provide a way to quickly detect partial trailer detachment and notify a driver, so that the detachment can be quickly addressed. In addition, embodiments described herein can mitigate the safety hazards associated with partial trailer detachment, for example by controlling aspects of steering and/or braking to facilitate quick and safe removal of the vehicle from the road, and to bring the trailer to a complete stop without significantly damaging the vehicle and the trailer.

Figure 1:
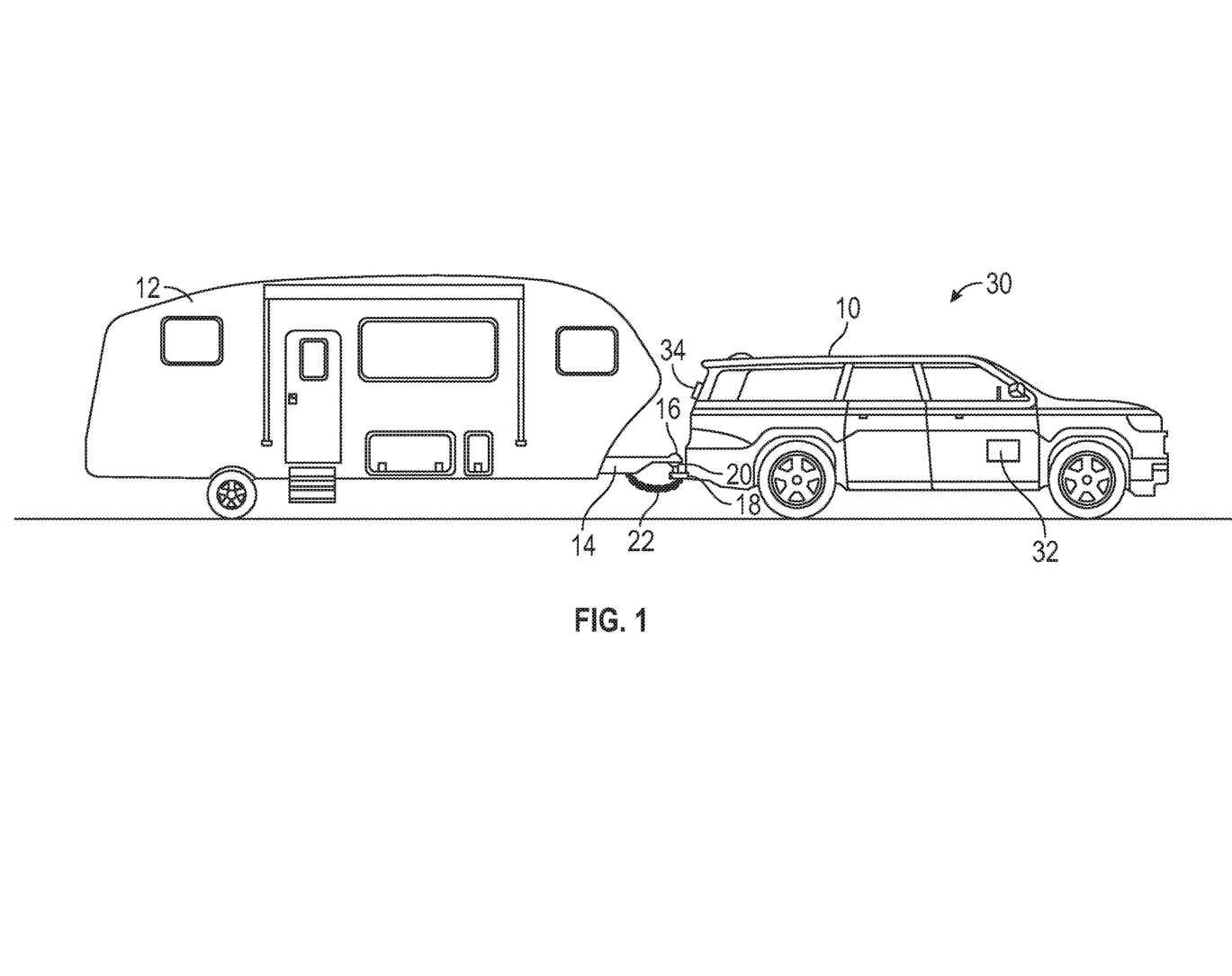
FIG. 1 depicts a vehicle and a trailer, the vehicle and/or the trailer including aspects of an embodiment of a system for detecting trailer detachment.

FIG. 1 shows an embodiment of a vehicle 10 and trailer 12. The vehicle 10 is connected to the trailer 12 by a suitable connection, such as a tow hitch, a fifth-wheel coupling, or another suitable coupling system. For example, the trailer 12 includes a frame 14 that includes a coupler 16, such as a ball coupler. The vehicle 10 includes a trailer hitch 18 having a ball 20 configured to be connected to the coupler 16. A safety device such as a safety chain 22 (or break away cable) is configured to be connected to the frame 14 and the trailer hitch 18 and to maintain a connection between the trailer 12 and the vehicle 10 in the event that the trailer 12 partially detaches from the vehicle 10.

The vehicle 10 and/or the trailer 12 includes components or aspects of a trailer monitoring system 30. The trailer monitoring system 30 includes a processing device 32 and one or more detection devices 34. For example, the one or more detection devices 34 can include a rear-facing camera (either as a component produced with the vehicle 10 or as an after-market add-on) and/or other one or more other devices such as radar and ultrasonic sensors. The one or more detection devices 32 are configured to monitor the connection between the trailer 12 and the vehicle 10, and to generate data such as an image that can be used by the processing device 32 to detect detachment of the trailer 12 from the vehicle 10. In one embodiment, the processing device 32 is configured to detect a partial detachment condition. As described herein, "partial detachment" or a "partial detachment condition" refers to a condition where the trailer hitch 18 has detached from the coupler 16, and the trailer 12 and the vehicle 10 remain connected by the safety chain 22 or other safety device.

The processing device 32 may also be configured to detect parameters related to the partial detachment condition. For example, the processing device 32 can estimate parameters such as a location of the coupler 16 (or a component thereof) and/or distance between the trailer hitch 18 (or a component thereof) and the coupler 16 (or a component thereof) when in a partially detached condition. Such parameters may be used to control aspects of the vehicle 10 to slow the vehicle, pull the vehicle off of the road, or otherwise mitigate safety hazards associated with the partial detachment condition.

Generally, the processing device 32 is configured to receive detection data, such as an image from a camera and/or a radar device, and to determine whether there is a partial detachment condition. The processing device 32 can perform various actions in response to determining that there is a partially detached condition. In one embodiment, the processing device 32 is configured to notify a driver and/or another processor if the trailer 12 is partially detached from the vehicle 10. For example, the processing device 32 can generate an alert to a driver, which can be an audible, visual and/or tactile alert. A visual alert may be a text or graphical indication such as an alert symbol (e.g., a symbol indicating that the trailer has partially detached from the vehicle) and/or animation. Examples of an audible alert include a beeping or alarm sound. A tactile alert can be a vibration generated in any suitable vehicle component, such as a seat or steering wheel vibration.

In one embodiment, the processing device 32 can perform one or more control actions to address the partial detachment condition. For example, the processing device 32 can control vehicle braking (either directly or by communicating with a vehicle controller) to slow the vehicle 10 in a manner that reduces or substantially eliminates the risk of collision between the trailer 12 and the vehicle 10. In another example, the processing device 32 can control vehicle steering (either directly or by communicating with a vehicle controller) to prevent excessive steering (referred to as panic steering) and/or control steering and braking autonomously to safely pull the vehicle off the road.

Figure 2:
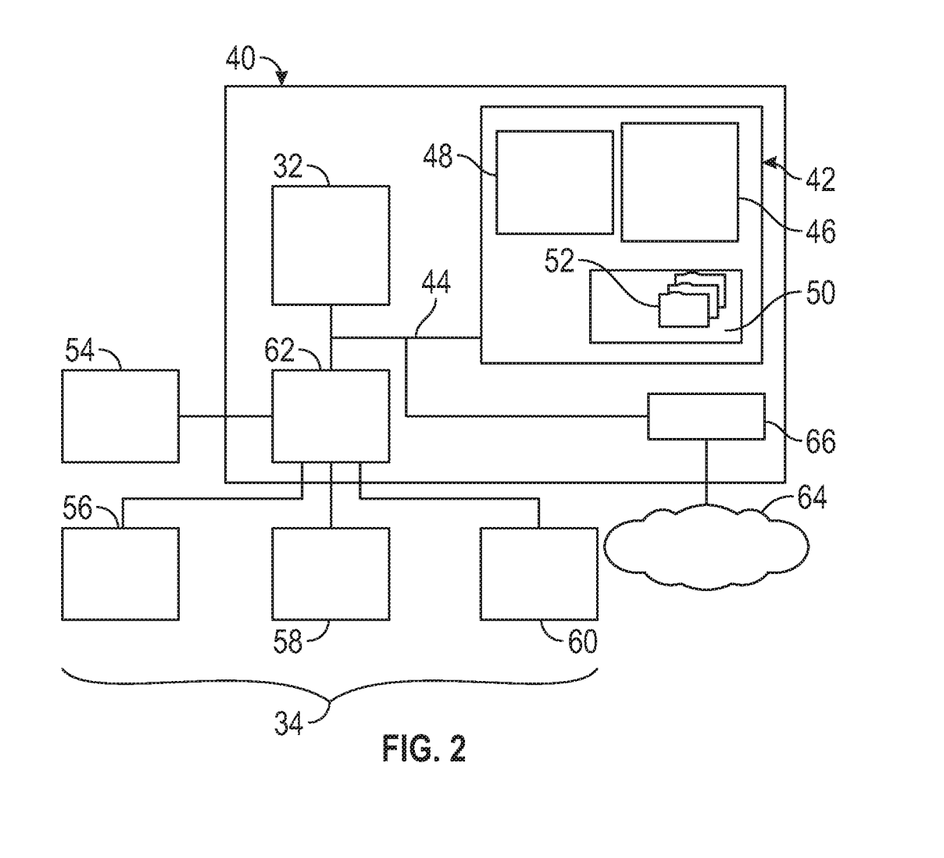
FIG. 2 depicts an embodiment of a computing system configured to perform aspects of a trailer detachment detection method.

FIG. 2 illustrates aspects of an embodiment of a computer system 40 that is in communication with, or is part of, the trailer monitoring system 30, and that can perform various aspects of partial detachment detection and/or vehicle control. The computer system 40 includes one or more detection devices 34 and at least one processing device 32. The processing device 32 generally includes one or more processors for performing aspects of trailer detachment detection and/or control methods described herein. The processing device 32 can be integrated into the vehicle 10, for example as an onboard processor in the vehicle 10, or can be a processing device remote from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 communicates with the one or more detection devices 34 and/or with various subsystems in the vehicle 10, such as a steering subsystem and a braking subsystem.

Components of the computer system 40 include the processing device 32 (such as one or more processors or processing units), a system memory 42, and a bus 44 that couples various system components including the system memory 42 to the processing device 32. The system memory 42 may include a variety of computer system readable media. Such media can be any available media that is accessible by the processing device 32, and includes both volatile and non-volatile media, removable and non-removable media.

For example, the system memory 42 includes a storage system 46 for reading from and writing to a non-removable, non-volatile memory (e.g., a hard drive). The system memory 42 may also include volatile memory 48, such as random access memory (RAM) and/or cache memory. The computer system 40 can further include other removable/non-removable, volatile/non-volatile computer system storage media.

The system memory 42 can include at least one program product having a set (e.g., at least one) of program modules that are configured to carry out functions of the embodiments described herein. For example, the system memory 42 stores a program/utility 50, having a set (at least one) of program modules 52. The program/utility 50 may be an operating system, one or more application programs, other program modules, and program data. The program modules 52 generally carry out the functions and/or methodologies of embodiments described herein. For example, the program modules 52 can include modules for performing various functions, such as acquiring data from the one or more detection devices 34, identifying partial detachment conditions, estimating the position and/or distance of components, and/or controlling aspects of vehicle operation.

The processing device 32 can also communicate with one or more external devices 54 such as a keyboard, a pointing device, a display, and/or any devices (e.g., network card, modem, etc.) that enable the processing device 32 to communicate with one or more other computing devices. In addition, the processing device 32 can communicate with the one or more detection devices 34, such as a camera 56, a radar device 58 and/or an ultrasound or ultrasonic device 60. Such communication can occur via Input/Output (I/O) interfaces 62.

The processing device 32 may also communicate with one or more networks 64 such as a local area network (LAN), a general wide area network (WAN), and/or a public network (e.g., the Internet) via a network adapter 66. It should be understood that although not shown, other hardware and/or software components can be used in conjunction with the computing system 40. Examples include, but are not limited to: microcode, device drivers, redundant processing units, external disk drive arrays, RAID systems, tape drives, and data archival storage systems, etc.

Figure 3:
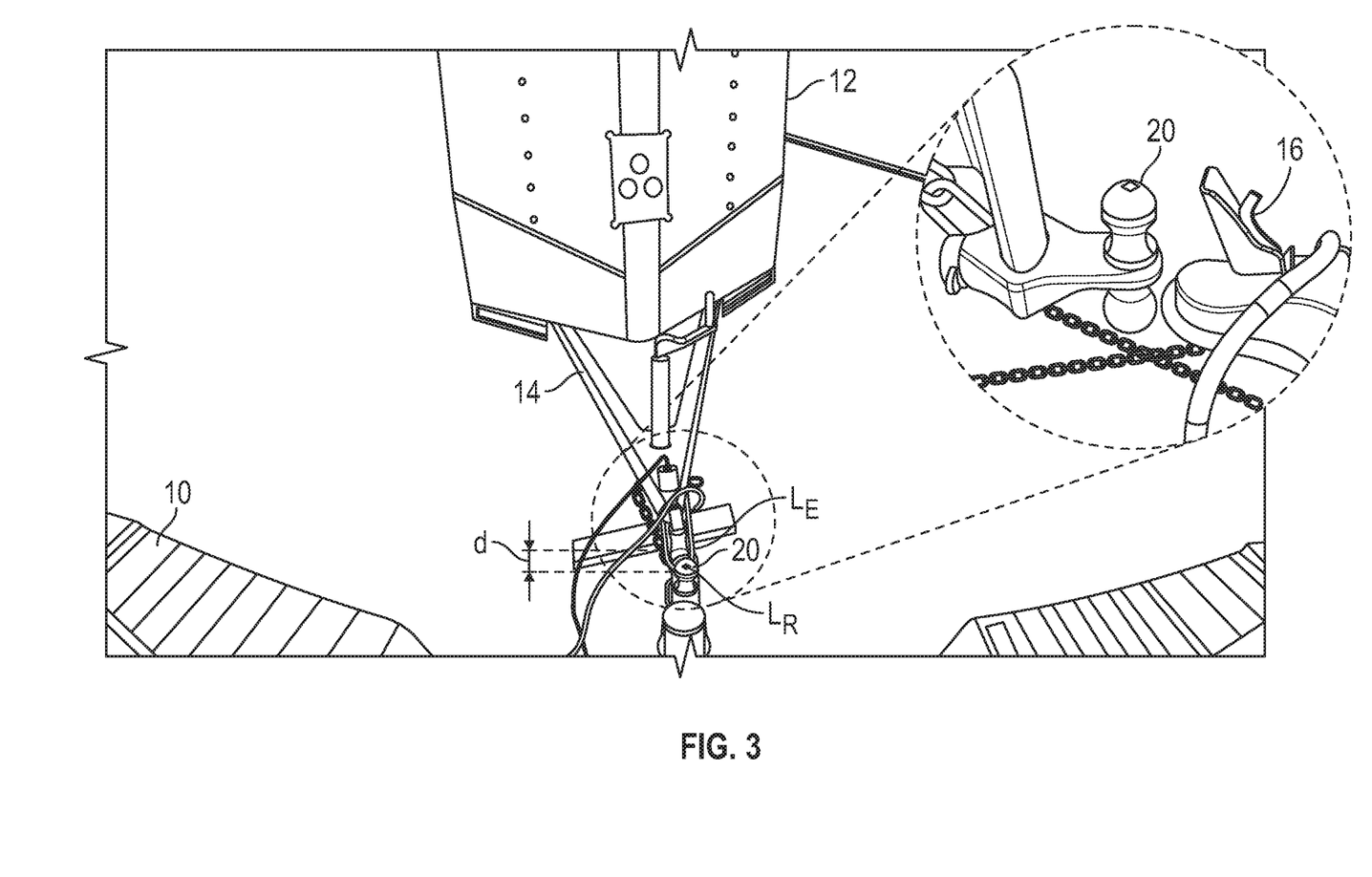
FIG. 3 depicts an embodiment of components of a vehicle and a trailer, and illustrates aspects of a trailer detachment detection method.

FIG. 3 shows an example data that can be generated by a detection device 34 of FIG. 2. In this example, the data includes an image generated by the camera 56, which shows parts of the vehicle 10 and the trailer 12. The image can be used by the trailer monitoring system 30 to detect a partial detachment condition and/or to control aspects of the vehicle 10. In this example, the camera 56 is a rear-facing camera that takes video and/or still images, either continuously, periodically or in response to detection of a partial detachment condition.

In one embodiment, the trailer monitoring system 30 includes a detection device (such as the detection device 34 of FIG. 1) that can detect a position of a component of the vehicle 10 and/or the trailer 12. Referring again to FIG. 3, the processing device 32, of FIG. 2, can detect the partial detached condition using the image in a variety of ways. For example, the processing device 32 can employ a calibrated image recognition technique or algorithm to identify that the ball 20 is exposed. If the trailer 12 is fully attached, the ball 20 is not visible (or is only partially visible) in the image. If the trailer 12 becomes partially detached, in some instances, the ball 20 is readily visible in the image. In this example, the processing device 32 determines that a partial detachment condition exists if the ball 20 (or a selected amount of the ball 20) is visible in the image. As discussed further below, the processing device 32 can take various actions to address the partial detachment condition.

In one embodiment, the processing device 32 detects a partial detachment condition based on an estimated location ($L_E$) of the coupler 16 (or other component). The location $L_E$ can be inferred from the image (e.g., by comparing the location $L_E$ to a reference location ($L_R$)). The reference location $L_R$ can be previously selected based on a calibration image taken by the camera 56. The reference location $L_R$ can be a location of the coupler 16 when properly attached, or another location such as an edge of the image. For example, the reference location $L_R$ can be the bottom of the image, or a calibrated location of the coupler 16 when properly coupled. The processing device 32 detects the partial detachment condition if the coupler 16 is not at the reference location $L_R$, is some distance from the reference location $L_R$, (e.g., a distance d between $L_R$ and $L_E$ is greater than a threshold distance) or otherwise has moved from the reference location $L_R$.

Figure 4:
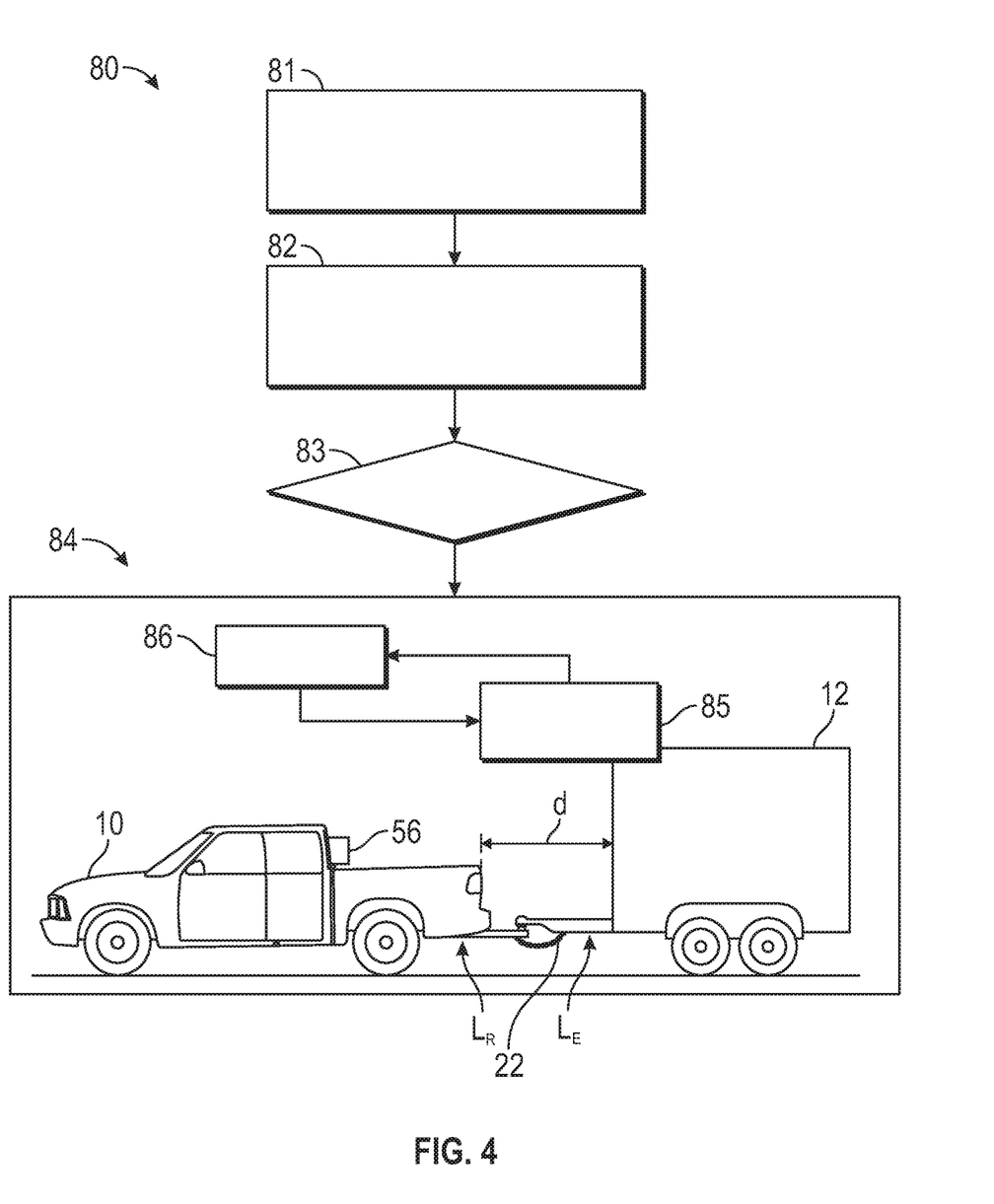
FIG. 4 is a flow chart depicting aspects of a method of detecting a partial trailer detachment condition and/or responding to the partial trailer detachment condition, in accordance with an aspect of an exemplary embodiment.

FIG. 4 shows aspects of an embodiment of a method 80 of detecting and/or responding to a partial detachment condition. The method 80 is described as being performed by the processing device 32 in the vehicle 10 as shown in FIG. 1, but is not so limited and can be performed by any suitable processing device or combination of processing devices, exclusively or in conjunction with a driver.

The method 80 is described in conjunction with an embodiment of the vehicle 10 coupled to the trailer 12. In this embodiment, the vehicle 10 includes a detection device in the form of a rear-facing camera 56. The method 80 is not so limited and can be performed using any combination of detection devices that can be used to detect partial detachment, determine the location of components and/or determine the distance between locations of components. Examples of such devices include cameras, radar sensors, ultrasound or ultrasonic detectors, proximity detectors (e.g. RFID) and others.

The method 80 is discussed in conjunction with blocks 81-86. The method 80 is not limited to the number or order of steps therein, as some steps represented by blocks 81-86 may be performed in a different order than that described below, or fewer than all of the steps may be performed.

At block 81, a coupling between the vehicle 10 and the trailer 12 is monitored by taking images or otherwise collecting data that can be used to detect decoupling and/or partial detachment. For example, the rear-facing camera 56 takes images and/or video at various times during operation of the vehicle 10. Images may be taken periodically, for example, and transmitted to the processing device 32 for analysis.

The processing device 32 receives data such as an image of at least parts of the coupler 16 and the trailer hitch 18. In one embodiment, the processing device 32 determines that a partial detachment has occurred if the ball 20 (or other hitch component) is visible, indicating that the trailer coupler 16 has detached from the trailer hitch 18.

In one embodiment, a location of a component such as the coupler 16 is determined based on the image, and the location is compared to a reference location. If the component is outside of the reference location, or outside of a selected distance from the reference location, a partial detachment condition is detected.

At block 82, in response to detecting the partial detachment condition, an indication or notification is presented to the driver of the vehicle 10. The notification may be an audible notification (e.g., a beeping or alarm sound), a tactile notification (e.g., a vibration), a visual notification (e.g., displayed in the screen of an on-board computer or a mobile device) or a combination thereof.

At block 83, in one embodiment, the driver can instruct the processing device 32 to control the vehicle 10 to slow the vehicle and/or pull the vehicle over. The instruction can be accomplished by an input performed by the driver. For example, the driver can press a button or icon on a display of the on-board processor or the mobile device.

At block 84, if the driver so instructs, the processing device 32 initiates braking of the vehicle 10, either directly or in conjunction with another processor or controller, such as an ECU.

In one embodiment, braking of the vehicle 10 is performed by estimating a distance d between a reference location $L_R$ and an estimated location $L_E$ of a component of the trailer. The reference location $L_R$ can be, for example, a location of a surface of the trailer 12 as shown in FIG. 4, a location of the coupler 16 as shown in FIG. 2, or any other location. The processing device 32 continuously or periodically measures the distance d (block 85) and applies an amount of braking force based on the distance d (block 86). For example, the processing device 32 employs a feedback loop in which the distance d is measured, an amount of braking force is applied, and the distance d is again measured. If the distance d is greater than a selected value, the braking force is increased to avoid straining or breaking the safety chain 22. If the distance d is less than a selected amount, the braking force is decreased to avoid a collision between the trailer 12 and the vehicle 10. This process is repeated until the vehicle 10 has stopped, the vehicle has slowed to a threshold speed, or the driver takes manual control of the braking. In this way, the processing device 32 applies brakes gradually while receiving distance to trailer data to prevent braking too fast and causing damage to the vehicle 10 and/or the trailer 12.

Figure 5:
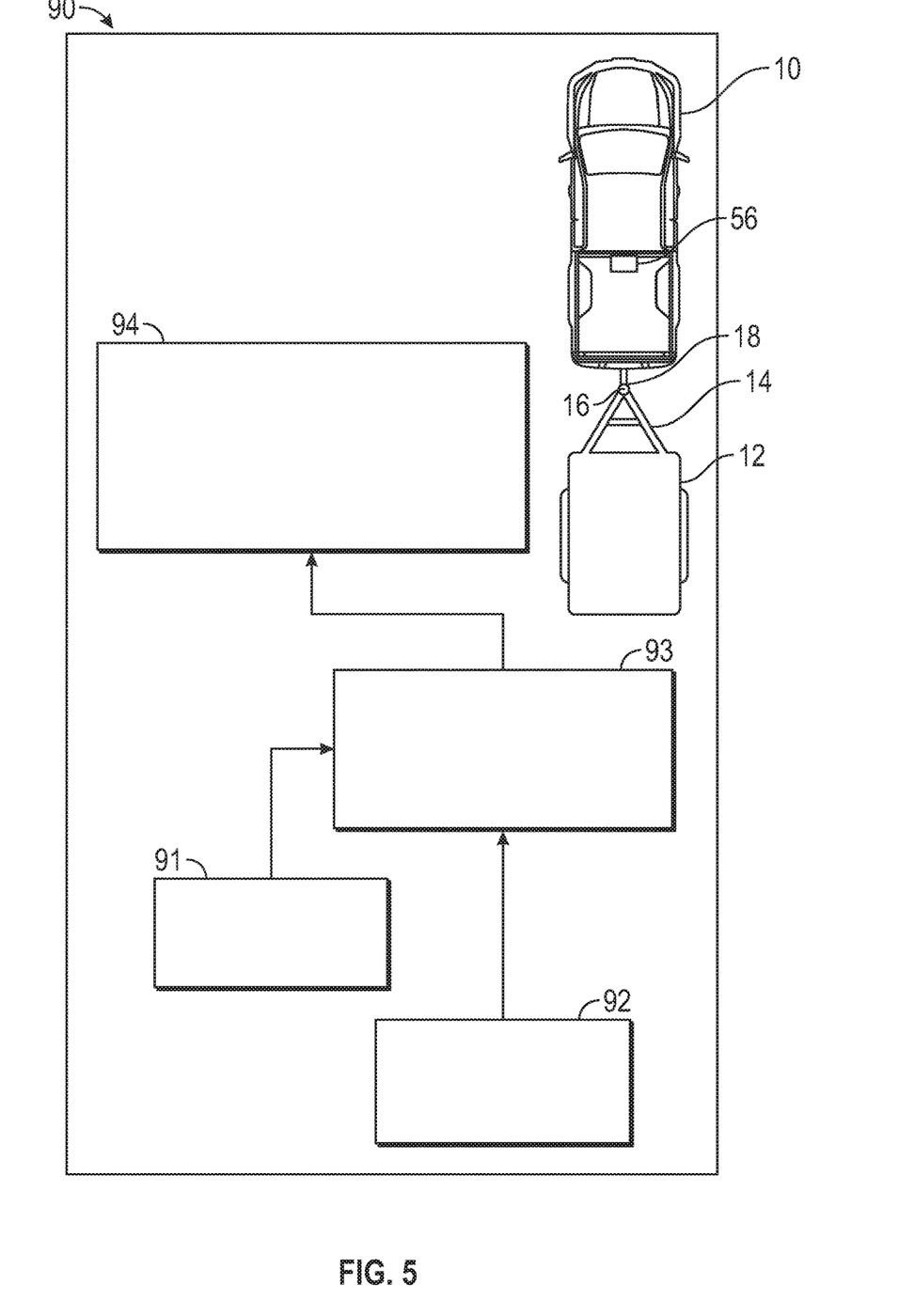
FIG. 5 is a flow chart depicting aspects of a method of detecting a partial trailer detachment condition and/or responding to the partial trailer detachment condition, in accordance with an aspect of an exemplary embodiment.

FIG. 5 depicts aspects of an embodiment of a method 90 for controlling a vehicle in response to the detection of a partial detachment condition. The method 90 can be employed, for example, to prevent panic steer by monitoring and limiting user steering input during a partial detachment condition, and/or to assist or facilitate a safe pullover maneuver. The method 90 can be performed in conjunction with the method 80. For example, detection of the partial detachment condition and notification can be performed as shown in blocks 81-83. The vehicle 10 can then be controlled according to the method 90, either in addition to the braking control shown in blocks 85 and 86 or in place of the braking control.

The method 90 is described as being performed by a processing device 32 in the vehicle 10 as shown in FIG. 1, but is not so limited and can be performed by any suitable processing device or combination of processing devices, exclusively or in conjunction with a driver. In addition, the method is described in conjunction with an embodiment of the vehicle 10 coupled to a trailer 12, as shown in FIG. 5, which includes a rear-facing camera 56, but is not so limited.

The method 90 is discussed in conjunction with blocks 91-94. The method 90 is not limited to the number or order of steps therein, as some steps represented by blocks 91-94 may be performed in a different order than that described below, or fewer than all of the steps may be performed.

At block 91, in response to detecting a partial detachment condition and/or in response to a driver instruction, the processing device 32 receives data indicative of user steering. For example, an angular position of the vehicle's steering wheel is detected at one or more times.

At block 92, in one embodiment, the processing device 32 estimates an angle of the trailer 12, the frame 14 and/or the coupler 16 relative to the vehicle trailer hitch 18, or vice versa. The angle can be estimated in any suitable manner. For example, the processing device 32 can be configured to identify a center line of the trailer hitch 18, estimate a center line of the coupler 16 and/or the frame 14, and compare the center lines to estimate an angle of the trailer 12 relative to the vehicle 10.

At block 93, the processing device determines whether the vehicle steering wheel position is within a selected range or threshold. For example, the processing device 32 can compare the detected angular position to a threshold angular position, and determine whether the detected angular position meets or exceeds that threshold angular position. In addition, the processing device 32 can estimate a steering rate based on the steering input (i.e., the speed at which the steering wheel is being turned), and compare the steering rate to a threshold rate.

At block 94, the processing device 32 controls aspects of steering to avoid hazards, based on the estimated angular position and/or steering rate. For example, the processing device 32 can take over steering autonomously to maintain the trailer angle within selected limits, or can limit steering (limit the steering position or the rate of steering) to avoid oversteering and maintain the trailer angle within selected limits.

In one embodiment, the processing device 32 can autonomously control vehicle braking and steering to control the vehicle 10, for example, to safely pull the vehicle off of a road. For example, the processing device 32 can utilize estimations of the angle of the trailer 12 (the trailer angle) to facilitate such control.

Although the various detection devices are shown and discussed as being mounted on or otherwise included in a vehicle 10, embodiments described herein are not so limited. For example, one or more detection devices (e.g., detection device 34 and/or 56) may be mounted on the trailer 12 and/or the tow frame 14. In this example, the one or more detection devices can communicate via wires or cable connected between the vehicle 10 and the trailer 12, and/or via wireless connection, such as cellular, near-field communication (e.g., Bluetooth) and wi-fi.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for monitoring a trailer, comprising:
    a detection device configured to monitor a connection between a coupler attached to the trailer and a trailer hitch attached to a vehicle when the vehicle is in operation and the trailer is connected to the vehicle, and generate data related to the connection; and
    a processing device configured to receive the data from the detection device, analyze the data to detect whether a partial detachment condition is present, and based on detecting the partial detachment condition, perform at least one of:
    generating a notification to a driver to alert the driver of the partial detachment condition; and
    controlling operation of the vehicle.

2. The system of claim 1, wherein the detection device includes a camera and the data includes an image of at least a part of the coupler and at least a part of the trailer hitch.

3. The system of claim 2, wherein the trailer hitch includes a ball, and the processing device is configured to detect the partial detachment condition based on the ball being visible in the image.

4. The system of claim 2, wherein the processing device is configured to compare a location of the coupler to a reference location, and to detect the partial detachment condition based on the location of the coupler being a distance from the reference location exceeding a selected threshold distance.

5. The system of claim 1, wherein controlling the operation of the vehicle includes controlling vehicle braking.

6. The system of claim 5, wherein the processing device is configured to compare a location of the coupler to a reference location, and to adjust a braking force based on a distance between the location of the coupler and the reference location.

7. The system of claim 1, wherein controlling operation of the vehicle includes controlling vehicle steering.

8. The system of claim 7, wherein controlling vehicle steering includes limiting an angular range of steering to avoid oversteering by the driver.

9. The system of claim 7, wherein controlling vehicle steering includes autonomously steering the vehicle to remove the vehicle and the trailer from a road.

10. The system of claim 1, wherein the partial detachment condition is detected based on the coupler and the trailer hitch being separated and the vehicle being connected to the trailer by a safety device.

11. A method of monitoring a trailer, comprising:
    monitoring, by a detection device, a connection between a coupler attached to the trailer and a trailer hitch attached to a vehicle when the vehicle is in operation and the trailer is connected to the vehicle, and generating data related to the connection; and
    receiving the data from the detection device by a processing device, analyzing the data to detect a partial detachment condition, and based on detecting the partial detachment condition, performing at least one of:
    generating a notification to a driver to alert the driver of the partial detachment condition; and
    controlling operation of the vehicle.

12. The method of claim 11, wherein the detection device includes a camera, and receiving the data includes receiving an image of at least a part of the coupler and at least a part of the trailer hitch.

13. The method of claim 12, wherein the trailer hitch includes a ball, and detecting the partial detachment condition is based on the ball being visible in the image.

14. The method of claim 12, wherein analyzing the data includes comparing a location of the coupler to a reference location, and the partial detachment condition is detected based on the location of the coupler being a distance from the reference location exceeding a selected threshold distance.

15. The method of claim 11, wherein controlling operation of the vehicle includes controlling vehicle braking.

16. The method of claim 15, wherein controlling vehicle braking includes comparing a location of the coupler to a reference location, and adjusting a braking force based on a distance between the location of the coupler and the reference location.

17. The method of claim 11, wherein controlling operation of the vehicle includes controlling vehicle steering.

18. The method of claim 17, wherein controlling vehicle steering includes limiting an angular range of steering to avoid oversteering by the driver.

19. The method of claim 17, wherein controlling vehicle steering includes autonomously steering the vehicle to remove the vehicle and the trailer from a road.

20. The method of claim 11, wherein the partial detachment condition is detected based on the coupler and the trailer hitch being separated and the vehicle being connected to the trailer by a safety device.

* * * * *